United States Patent
Colvin

(10) Patent No.: US 7,160,223 B2
(45) Date of Patent: Jan. 9, 2007

(54) METHOD FOR INHIBITING ENGINE STALLING IN A HYBRID VEHICLE

(75) Inventor: Dan Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 10/711,203

(22) Filed: Sep. 1, 2004

(65) Prior Publication Data
US 2005/0079950 A1    Apr. 14, 2005

Related U.S. Application Data

(60) Provisional application No. 60/501,706, filed on Sep. 10, 2003.

(51) Int. Cl.
*B60K 1/02* (2006.01)
*B60W 10/04* (2006.01)

(52) U.S. Cl. .......................................... 477/3; 477/107
(58) Field of Classification Search .................... 477/3, 477/111, 107; 903/942; 180/65.2, 65.3, 180/65.4
See application file for complete search history.

(56) References Cited

U.S. PATENT DOCUMENTS

| | | | |
|---|---|---|---|
| 6,079,204 A | 6/2000 | Sun et al. | |
| 6,109,237 A | 8/2000 | Pels et al. | |
| 6,133,702 A | 10/2000 | Noble et al. | |
| 6,174,264 B1 * | 1/2001 | Hoshiba et al. | 477/111 |
| 6,176,808 B1 | 1/2001 | Brown et al. | |
| 6,193,628 B1 | 2/2001 | Hrovat et al. | |
| 6,291,902 B1 * | 9/2001 | Ogane et al. | 903/942 |
| 6,345,216 B1 * | 2/2002 | Morimoto et al. | 477/7 |
| 6,404,332 B1 * | 6/2002 | Wakashiro et al. | 477/5 |
| 6,585,066 B1 | 7/2003 | Koneda et al. | |
| 6,702,718 B1 * | 3/2004 | Tani et al. | 477/203 |
| 2001/0004203 A1 * | 6/2001 | Matsubara et al. | 180/65.1 |

* cited by examiner

*Primary Examiner*—Roger Pang
(74) *Attorney, Agent, or Firm*—David B. Kelley; Brooks & Kushman

(57) ABSTRACT

A method for inhibiting stalling of an engine of a hybrid electric vehicle. The method includes determining whether the engine is running, determining whether a gear ratio of a power transfer unit is selected, starting a timer, and implementing a stall mitigation strategy. The stall mitigation strategy is terminated when a predetermined period of time has elapsed.

20 Claims, 3 Drawing Sheets

METHOD FOR INHIBITING ENGINE STALLING IN A HYBRID VEHICLE

CROSS-REFERENCE TO RELATED APPLICATIONS

This application claims the benefit of U.S. provisional application Ser. No. 60/501,706 filed Sep. 10, 2003.

BACKGROUND OF THE INVENTION

1. Field of the Invention

The present invention relates generally to the control of a hybrid electric vehicle, and more particularly to a method for inhibiting stalling of an engine of a hybrid electric vehicle.

2. Background Art

Hybrid electric vehicles have drivetrains adapted to provide torque to one or more vehicle traction wheels. A drivetrain may include a torque converter and a transmission. The torque converter transfers engine torque to an input shaft of the transmission. The transmission transmits torque to the traction wheels to propel the vehicle.

The applicant of the present invention has discovered that when a hybrid vehicle drivetrain is configured without a torque converter, the engine may experience increased load forces that impede engine rotation. These load forces will stall the engine if they exceed the engine torque. In addition, the load forces are transferred to the engine more rapidly in the absence of a torque converter. As a result, there is less time to predict and prevent engine stalling, such as by increasing engine speed and torque to brace for the anticipated load forces. An electrical machine, such as a starter-alternator, may be used to provide torque to the engine. However, the applicant has discovered that an electrical machine can rapidly consume power and deplete a power source in the absence of an intelligent method of control.

Before applicant's invention, there was a need for an improved method of inhibiting engine stalling in the drivetrain of a hybrid electric vehicle, and more particularly in a drivetrain that does not employ a torque converter. In addition, there was a need for a control methodology that intelligently inhibits engine stalling and reduces depletion of a power source. Problems associated with the prior art is noted above and other problems are addressed by the Applicant's invention as summarized below.

SUMMARY OF THE INVENTION

According to one aspect of the present invention, a method for inhibiting stalling of an engine of a hybrid electric vehicle is provided. The hybrid electric vehicle includes a power transfer unit and at least one power source adapted to drive the power transfer unit. The power transfer unit is adapted to drive a vehicle wheel and has a plurality of gear ratios.

The method includes steps of determining whether the engine is running, determining whether a gear ratio of the power transfer unit is selected, and implementing a stall mitigation strategy for a predetermined period of time if the engine is running and a gear ratio is selected. This method controls the amount of time that the stall mitigation strategy is active to reduce power source depletion.

The hybrid electric vehicle may include an electrical machine coupled to the engine and adapted to be powered by at least one power source. The stall mitigation strategy may include providing supplemental torque to the engine with the electrical machine to keep an engine speed above a first threshold speed value. The first threshold speed value may be less than an engine idle speed. As such, engine stalling is inhibited without affecting engine idling.

The stall mitigation strategy may also be terminated when the engine speed is greater than a second threshold speed value or when an accelerator pedal is actuated. The second threshold speed value may be greater than the engine idle speed. As such, the stall mitigation strategy is utilized in situations where engine speed or torque may be sufficiently low as to indicate an increased likelihood of engine stalling.

The step of determining whether a gear ratio of the power transfer unit is selected may be based on a signal from a gear selector sensor.

According to another aspect of the present invention, a method for inhibiting stalling of an engine of a hybrid electric vehicle is provided. The hybrid electric vehicle has a set of power sources that includes the engine and at least one secondary power source. The hybrid electric vehicle also includes a power transfer unit, an electrical machine coupled to the engine and the power transfer unit and adapted to be powered by at least one member of the set of power sources, a first signal indicative of an engine speed, and a second signal indicative of a desired gear ratio of the power transfer unit.

The method includes the steps of determining whether the engine is running based on the first signal, determining whether a gear ratio of the power transfer unit is selected based on the second signal, implementing a stall mitigation strategy to keep the engine speed above a first threshold speed value if the engine is running and a gear ratio of the power transfer unit is selected, and terminating the stall mitigation strategy if a predetermined period of time has elapsed.

The step of implementing the stall mitigation strategy may include powering the electrical machine with at least one member of the set of power sources and providing torque to the engine with the electrical machine to keep the engine speed above the first threshold speed value. The electrical machine may be a starter-alternator or a motor-generator.

According to another aspect of the present invention, a method for inhibiting stalling of an internal combustion engine of a hybrid electric vehicle due to loading of an engine output shaft is provided. The hybrid electric vehicle includes a power transfer unit, a set of power sources, a starter-alternator, and an accelerator pedal. The power transfer unit is adapted to drive at least one vehicle wheel and has a plurality of gear ratios. The set of power sources includes an engine and at least one voltage source. The starter-alternator is coupled to the engine and the power transfer unit and is adapted to be powered by at least one member of the set of power sources.

The method includes starting the engine with the starter-alternator, determining whether a gear ratio has been selected, starting a timer, implementing a stall mitigation strategy to maintain the engine speed above a first threshold speed value, and discontinuing the stall mitigation strategy if the engine speed is greater than a second threshold speed value, if predetermined period of time has elapsed, or if the accelerator pedal is actuated.

The step of determining whether a gear ratio has been selected may be based on a signal indicative of engagement of a gear ratio of the power transfer unit.

DETAILED DESCRIPTION OF THE PREFERRED EMBODIMENT(S)

Figure 1:
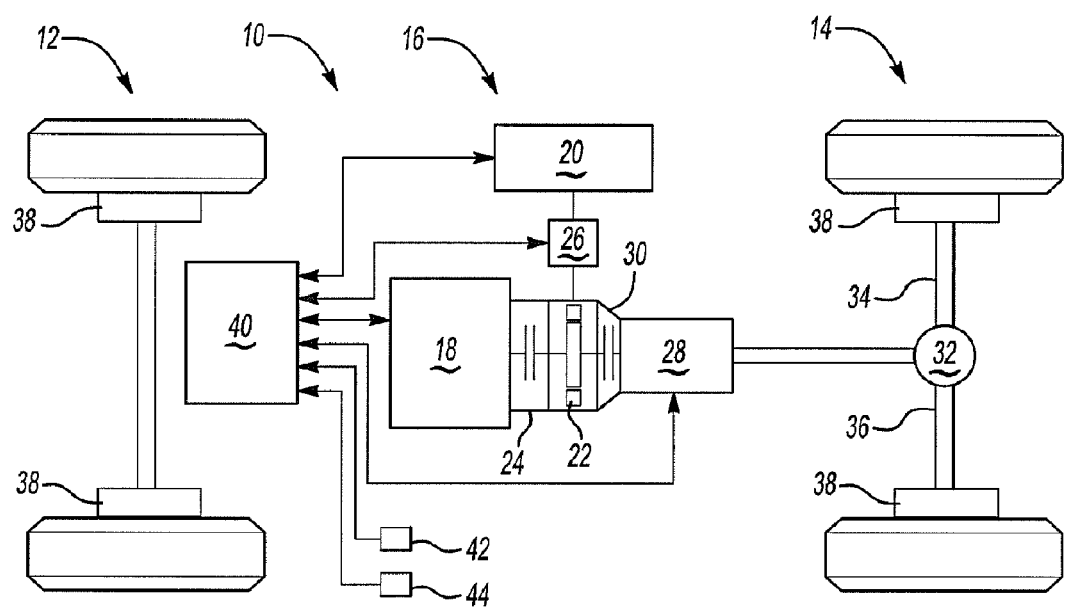
FIG. 1 is a schematic of a hybrid electric vehicle.

Referring to FIG. 1, a schematic of a hybrid electric vehicle 10 is shown. The hybrid electric vehicle 10 includes a first wheel set 12, a second wheel set 14, and a wheel drive system or drivetrain 16.

The drivetrain 16 may be configured to drive or provide torque to the first and/or second wheel sets 12,14. The drivetrain 16 may have any suitable configuration, such as a parallel drive, series drive, or split hybrid drive as is known by those skilled in the art. In the embodiment shown in FIG. 1, a parallel drive configuration is shown.

The hybrid electric vehicle 10 includes any suitable number of power sources. In the embodiment shown in FIG. 1, the hybrid electric vehicle 10 includes a primary power source 18 and a secondary power source 20.

The primary power source 18 may be any suitable energy generation device, such as an internal combustion engine adapted to combust any suitable type of fuel like gasoline, diesel fuel, or hydrogen.

The secondary power source 20 may be of any suitable type. For example, a non-electrical power source, such as a hydraulic power source, may be employed. Optionally, an electrical power source such as a battery, a battery pack having a plurality of electrically interconnected cells, a capacitor, or a fuel cell may be utilized. If a battery is used it may be of any suitable type, such as nickel-metal hydride (Ni—MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. For simplicity, the description below will primarily refer to an embodiment of the present invention that incorporates an electrical power source.

The primary and secondary power sources 18,20 are adapted to provide power to the drivetrain 16. The primary power source 18 is selectively coupled to an electrical machine 22, such as a motor, motor-generator, or starter-alternator, via a first clutch 24. If the first clutch 24 is engaged, the primary power source 18 may propel the hybrid electric vehicle 10. If the first clutch 24 is disengaged, the secondary power source 20 may power the electrical machine 22 to propel the hybrid electric vehicle 10. In addition, both the primary and secondary power sources 18,20 may simultaneously provide power to the electrical machine 22.

An inverter 26 may be disposed between the secondary power source 20 and the electrical machine 22. The inverter 26 converts direct current (DC) to alternating current (AC) when current flows from the secondary power source 20 and converts alternating current (AC) to direct current (DC) when current flows to the secondary power source 20.

The electrical machine 22 may be selectively coupled to a power transfer unit 28 via a second clutch 30. The power transfer unit 28 may be of any suitable type, such as a multi-gear "step ratio" transmission, continuously variable transmission, or an electronic converterless transmission as is known by those skilled in the art.

The power transfer unit 28 is adapted to drive one or more vehicle wheels. In the embodiment shown in FIG. 1, the power transfer unit 28 is connected to a differential 32 in any suitable manner, such as with a driveshaft or chain. The differential 32 is connected to each wheel of the second wheel set 14 by a shaft 34,36, such as an axle or halfshaft.

The hybrid electric vehicle 10 may be configured with one or more energy recovery devices, such as a regenerative braking system 38 that captures and returns recovered energy to the secondary power source 20 via the electrical machine 22.

A vehicle system control module 40 may monitor and control various aspects of the hybrid electric vehicle 10. For example, the control module 40 may communicate with the primary power source 18, secondary power source 20, inverter 26, and power transfer unit 28 to monitor and control their operation and performance.

In addition, the control module 40 may receive input signals from various components. For example, the control module 40 may receive a signal from an accelerator pedal position sensor 42 indicative of the vehicle acceleration demanded by the driver. A gear selector sensor 44 may receive a signal from a driver-operated shift lever that is used to shift or select a gear ratio of the power transfer unit 28. The control module 40 may also receive signals from one or more speed sensors adapted to detect the rotational speed or rotational velocity of an associated component. For instance, a speed sensor, such as a magnetic or optical encoder, may be incorporated with the primary power source 18 to detect the rotational speed or velocity of a primary power source output shaft. Alternatively, a speed sensor may be disposed in the drivetrain 16 downstream of the primary power source 18, such as near the electrical machine 22, first clutch 24, transmission 28, or second clutch 30.

In a hybrid electric vehicle such as that previously described, it is possible to use the electrical machine 22 to provide torque to a primary power source. More specifically, the electrical machine 22 may be powered by one or more secondary power sources 20 to provide a driving torque to the primary power source 18 when the first clutch 24 is engaged. Conversely, the electrical machine 22 may also act as a generator to charge one or more secondary power sources under various operating conditions. However, an electrical machine 22 such as a starter-alternator cannot simultaneously provide torque to the engine and charge the secondary power source that acting as its source of power. As such, it is undesirable to use the electrical machine 22 to provide torque to the primary power source 18 for extended periods of time since the secondary power source 20 may become depleted and cannot be recharged using the electrical machine 22.

Figure 2:
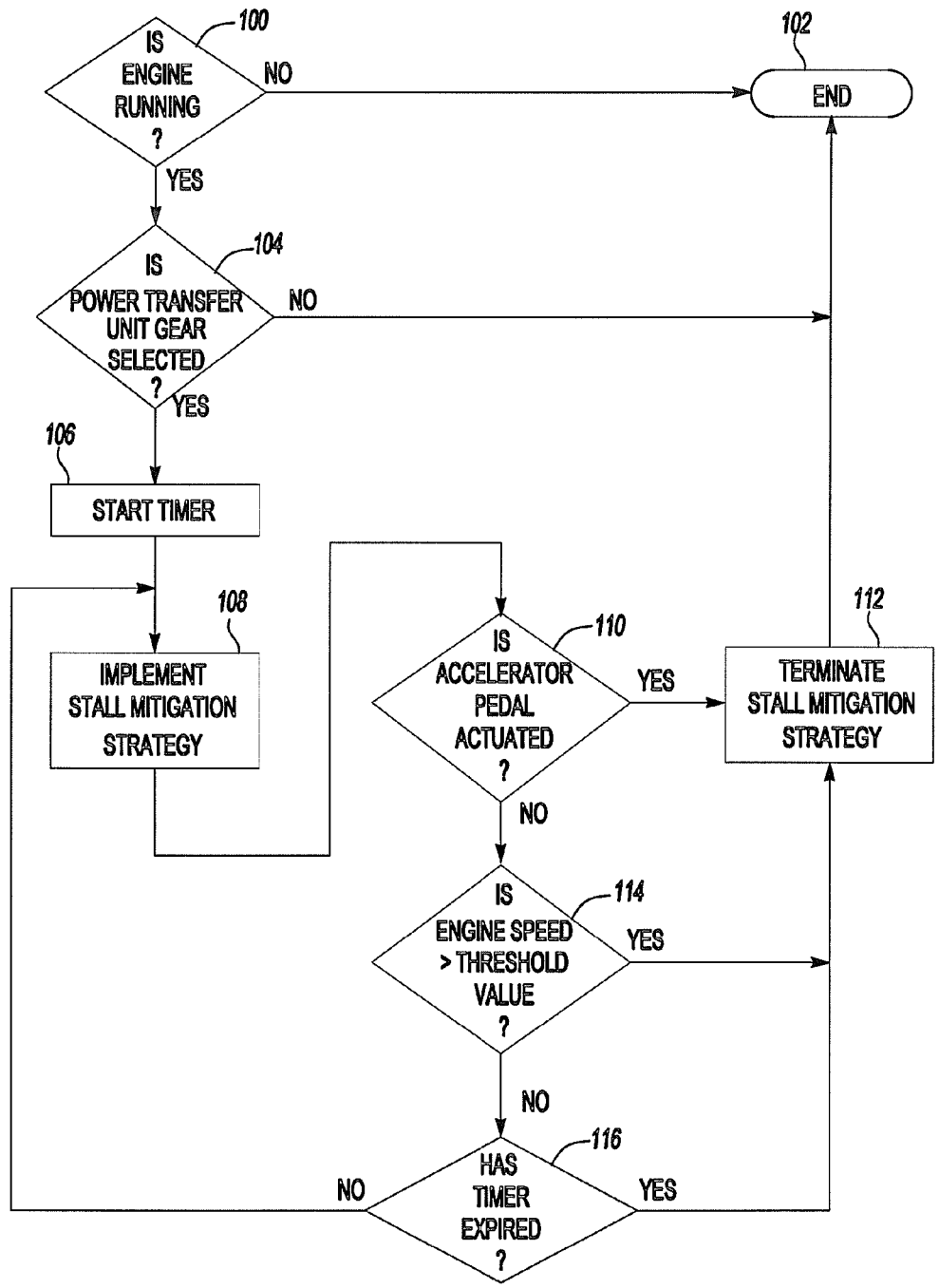
FIG. 2 is a flowchart of a method for inhibiting stalling of an engine of the hybrid electric vehicle.

Referring to FIG. 2, a flowchart of a method for inhibiting stalling of an engine of the hybrid electric vehicle 10 are shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by determining whether the engine is running. This determination is made by the control module using signals indicative of engine operation. For instance, the engine operational status may be determined using a signal from an engine speed sensor. Optionally, a sensor that detects rotation of a drivetrain component, such as an engine output shaft, may be employed. If the engine is not running, then the method ends at block 102. If the engine is running, then the method continues at block 104.

At 104, the method determines whether a gear ratio of the power transfer unit has been selected by the vehicle operator. A gear ratio includes a vehicle drive gear or reverse gear. Gear selection may be based on a signal from a gear selector sensor as previously discussed. Alternatively, this determination may be based on a signal from the power transfer unit that is indicative of the engagement of a gear ratio. If a gear has not been selected, then the method ends at block 102. If a gear has been selected, then the method continues at block 106.

At 106, a timer is initialized that measures the passage of time. The timer may be reset at any point in the method prior to starting time measurement.

At 108, the method implements a stall mitigation strategy. The stall mitigation strategy prevents the engine speed from dropping below a predetermined speed value. More specifically, the electrical machine is powered by one or more power sources and provides torque to the engine to maintain an engine rotational speed of at least the predetermined value. The predetermined speed value may be any suitable value and may be established by vehicle development testing. For example, the engine speed value may be set below an engine idle speed. In one embodiment, the engine idle speed is 1100 revolutions per minute (RPM) and the predetermined value is 100 RPM less than the engine idle speed. Optionally, the predetermined value may be based on a variable or dynamic value.

At 110, the method determines whether the accelerator pedal is actuated. Optionally, the method may determine whether the accelerator pedal is actuated by a predetermined amount or distance. Accelerator pedal actuation may be determined using a signal from the accelerator pedal position sensor as previously discussed. If the accelerator pedal is actuated or pressed, engine speed increases in response. As engine speed increases, the likelihood of engine stalling decreases since the engine speed or torque is likely to be sufficiently high to overcome drivetrain load forces. Therefore, the stall mitigation strategy may be discontinued. If the accelerator pedal is actuated, then the stall mitigation strategy is terminated at block 112 and the method ends at block 102. If the accelerator pedal is not actuated, then the method continues at block 114.

At 114, the engine speed is compared to a threshold value. The engine speed may be determined using a signal from the engine or a speed sensor as previously discussed. The threshold value may be any suitable value. For example, the threshold value may be 100 RPM greater than the engine idle speed. An engine speed greater than the threshold value indicates that engine stalling is unlikely. For example, the engine speed may be greater than the threshold value when the accelerator pedal is released and the vehicle is "coasting down" or decelerating from a high speed, such as on a highway exit ramp. In such conditions where the engine speed is greater than the threshold value, engine stalling is not a concern and the stall mitigation strategy is terminated at block 112. If the engine speed is not greater than the threshold value, then the method continues at block 116.

At 116, the method determines whether a predetermined period of time measured by the timer has elapsed. The predetermined period of time may be any suitable value, such as between 5 to 10 seconds. Low time values are desirable to reduce the period in which the secondary power source is loaded by the electrical machine and to permit the electrical machine to initiate or resume charging of the secondary power source. If the predetermined period of time has not elapsed, then the method returns to block 108. If the predetermined period of time has elapsed, then the stall mitigation strategy is terminated at block 112 and the method ends at block 102.

Figure 3A:
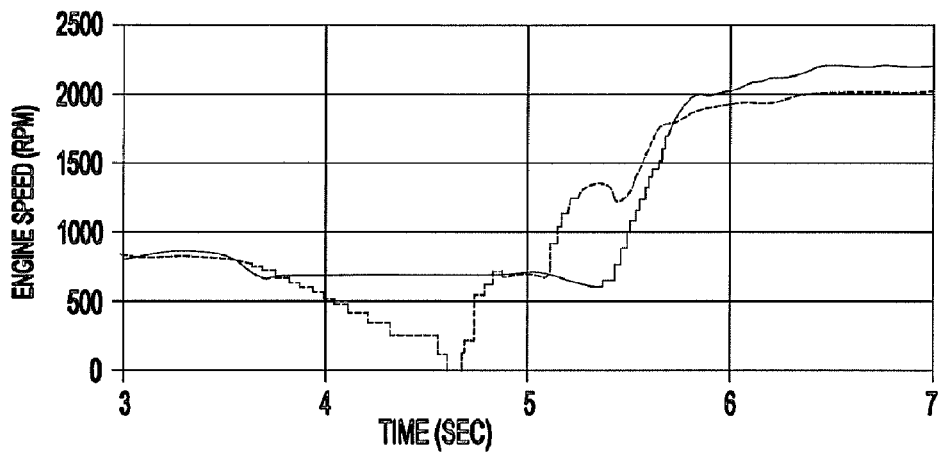
FIGS. 3A–3C are plots depicting operation of the hybrid electric vehicle in accordance with the method of FIG. 2.
Figure 3B:
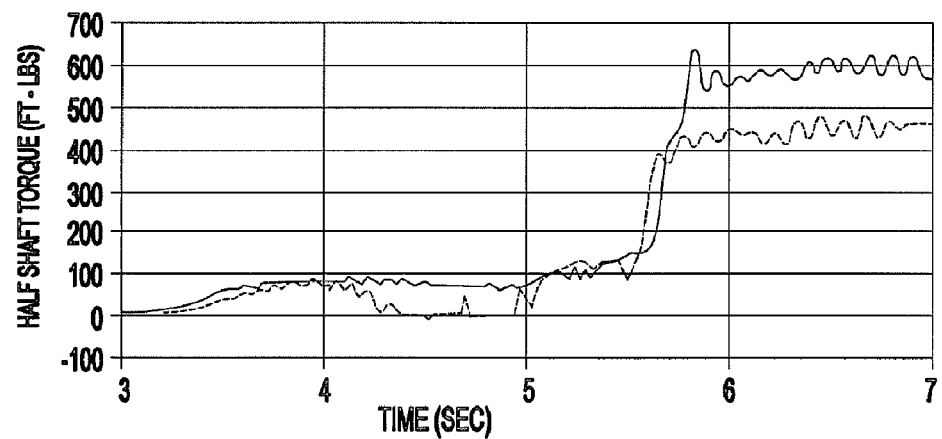
Figure 3C:
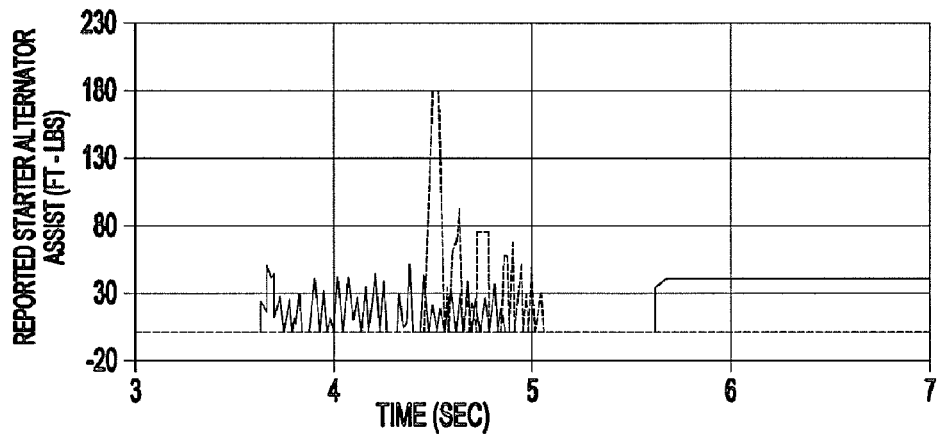

Referring to FIGS. 3A–3C, three exemplary plots depicting the operation of a hybrid electric vehicle over a single time interval are shown. FIG. 3A depicts the engine speed. FIG. 3B depicts the torque provided to the halfshafts and vehicle traction wheels. FIG. 3C depicts the assist torque provided to the engine by the electrical machine (configured as a starter-alternator in this example). The dashed lines represent vehicle performance attributes when the method of FIG. 2 is not employed (i.e, no stall mitigation). The solid lines represent vehicle performance attributes when the method of FIG. 2 is employed.

The "no stall mitigation" scenario (dashed lines) will now be discussed. Referring to FIG. 3A, the engine is operating at approximately 800 RPM from 3 to approximately 3.75 seconds. At approximately 3.75 seconds, the drivetrain load forces increase and begin to cause the engine to stall as indicated by the drop in engine speed. The engine speed drops to zero (i.e., the engine completely stalls) at approximately 4.6 seconds. The halfshaft output torque drops to zero between approximately 4.3 and 4.9 seconds as shown in FIG. 3B. As such, the engine needs to be restarted to provide propulsion torque to the vehicle wheels. Restarting of the engine is indicated in FIG. 3C by the spikes in starter-alternator torque between approximately 4.5 and 5 seconds. At 5 seconds, the vehicle operator actuates the accelerator pedal to request vehicle acceleration. As a result, there is a surge in engine speed between 5.1 and 5.4 seconds as shown in FIG. 3A. However, there is not an accompanying increase in halfshaft torque in FIG. 3B. After 5.4 seconds, the halfshafts begin to receive increased torque and the vehicle accelerates. The engine stall, engine surge, and delay in providing halfshaft torque are objectionable to the vehicle operator.

In contrast, vehicle performance is noticeably improved when stall mitigation is employed (solid lines). Referring to FIG. 3A, the engine initially idles at approximately 800 RPM from 3 to approximately 3.75 seconds. At approximately 3.75 seconds, the drivetrain load forces again increase. In response, the stall mitigation strategy drives the starter-alternator to provide supplemental torque to the engine to inhibit stalling as indicated in FIG. 3C by the spikes in starter-alternator torque between 3.75 to 4.75 seconds. More specifically, the stall mitigation strategy maintains the engine speed at the threshold engine speed value, here 700 RPM, represented by the horizontal solid line in FIG. 3A. As a result, the engine does not stall and positive torque is continuously provided to the halfshafts and vehicle wheels to propel the vehicle as shown in FIG. 3B. At 5 seconds, the vehicle operator actuates the accelerator pedal to request vehicle acceleration. As a result, the stall mitigation strategy terminates and the engine speed is permitted to drop as indicated by the slight dip in engine speed between 5.1 and 5.3 seconds in FIG. 3A. Subsequently, the engine speed increases and more torque is provided to the halfshafts and vehicle wheels.

Optionally, the electrical machine may be used to provide "boost assist" or additional torque to the halfshafts and wheels. Boost assist is indicated in FIG. 3C by increased starter-alternator torque from 5.6 to 7 seconds. Boost assist results in more wheel torque, as indicated by the higher wheel torque values from 5.6 to 7 seconds in FIG. 3B for the "solid line" scenario.

The present invention inhibits engine stalling, thereby smoothly providing torque to the vehicle wheels without a decrease in wheel torque or objectionable engine surges. In addition, the present invention can be quickly discontinued when there is a low likelihood of engine stalling to increase charging time and decrease power demands. Moreover, the short duration in which stall mitigation is employed reduces charge depletion and increases the ability of a secondary power source to support electrical loads.

While the best mode for carrying out the invention has been described in detail, those familiar with the art to which this invention relates will recognize various alternative designs and embodiments for practicing the invention as defined by the following claims.

What is claimed is:

1. A method for inhibiting stalling of an engine of a hybrid electric vehicle, the hybrid electric vehicle including a power transfer unit adapted to drive a vehicle wheel and having a plurality of gear ratios, at least one power source adapted to drive the power transfer unit, and an electric machine adapted to be powered by the at least one power source, the method comprising:
   determining whether the engine is running;
   determining whether a gear ratio of the power transfer unit is selected; and
   implementing a stall mitigation strategy for a predetermined period of time if the engine is running and a gear ratio is selected, wherein the stall mitigation strategy includes providing supplemental torque to the engine with the electric machine to keep an engine speed above a first threshold speed value.

2. The method of claim 1 wherein the stall mitigation strategy is terminated if acceleration of the hybrid electric vehicle is requested or if the engine speed is greater than a second threshold speed value.

3. The method of claim 1 wherein the engine speed is measured at an output shaft of the engine.

4. The method of claim 1 wherein the electrical machine is a starter-alternator.

5. The method of claim 1 wherein the first threshold speed value is less than an engine idle speed.

6. The method of claim 1 further comprising the step of terminating the stall mitigation strategy if an engine speed is greater than a second threshold speed value.

7. The method of claim 6 wherein the second threshold speed value is greater than an engine idle speed.

8. The method of claim 6 wherein the hybrid electric vehicle further comprises an accelerator pedal and the step of terminating the stall mitigation strategy further comprises terminating the stall mitigation strategy when the accelerator pedal is actuated.

9. The method of claim 8 wherein the hybrid electric vehicle further comprises an accelerator pedal position sensor configured to detect actuation of the accelerator pedal.

10. The method of claim 1 wherein the hybrid electric vehicle further comprises a gear selector sensor and the step of determining whether a gear ratio of the power transfer unit is selected is based on a signal from the gear selector sensor.

11. A method for inhibiting stalling of an engine of a hybrid electric vehicle, the hybrid electric vehicle including a set of power sources that includes the engine and at least one secondary power source, a power transfer unit having a plurality of gear ratios adapted to drive a vehicle wheel, an electrical machine adapted to be powered by at least one member of the set of power sources and coupled to the engine and the power transfer unit, a first signal indicative of an engine speed, and a second signal indicative of a desired gear ratio of the power transfer unit, the method comprising:
   determining whether the engine is running based on the first signal;
   determining whether a gear ratio of the power transfer unit is selected based on the second signal;
   implementing a stall mitigation strategy to keep the engine speed above a first threshold speed value if the engine is running and a gear ratio of the power transfer unit is selected; and
   terminating the stall mitigation strategy if a predetermined period of time has elapsed.

12. The method of claim 11 wherein the stall mitigation strategy is terminated if the engine speed exceeds a second threshold speed value.

13. The method of claim 12 wherein the hybrid vehicle further comprises an accelerator pedal position sensor and the stall mitigation strategy is terminated based on a signal from the accelerator pedal position sensor indicative of a request for vehicle acceleration.

14. The method of claim 12 wherein the first threshold speed value is less than the second threshold speed value.

15. The method of claim 11 wherein the electrical machine is a starter-alternator.

16. The method of claim 11 wherein the electrical machine is a motor-generator.

17. The method of claim 11 wherein the hybrid electric vehicle further comprises a gear selector sensor and the step of determining whether a gear ratio of the power transfer unit is selected is based on a signal from the gear selector sensor.

18. The method of claim 11 wherein the step of implementing the stall mitigation strategy includes powering the electrical machine with at least one member of the set of power sources and providing torque to the engine with the electrical machine to keep the engine speed above the first threshold speed value.

19. A method for inhibiting stalling of an internal combustion engine of a hybrid electric vehicle due to loading of an engine output shaft, the hybrid electric vehicle including a power transfer unit adapted to drive at least one vehicle wheel and having a plurality of gear ratios, a set of power sources including an engine and at least one voltage source, a starter-alternator coupled to the engine and the power transfer unit and adapted to be powered by at least one member of the set of power sources, and an accelerator pedal, the method comprising:
  determining whether the engine is running;
  determining whether a gear ratio has been selected by a vehicle operator;
  starting a timer;
  implementing a stall mitigation strategy to maintain the engine speed above a first threshold speed value wherein the starter-alternator is powered by the at least one voltage source to provide torque to the engine if a gear ratio has been selected; and
  discontinuing the stall mitigation strategy if the engine speed is greater than a second threshold speed value, a predetermined period of time has elapsed, or if the accelerator pedal is actuated.

20. The method of claim 19 wherein the step of determining whether a gear ratio has been selected by a vehicle operator is based on a signal indicative of engagement of a gear ratio of the power transfer unit.

* * * * *